United States Patent [19]

Onizawa et al.

[11] Patent Number: 4,741,689
[45] Date of Patent: May 3, 1988

[54] INJECTION MOLD FOR AN OPTICAL DISK

[75] Inventors: Yoshio Onizawa, Hyogo; Yasushi Hiramatsu, Himeji, both of Japan

[73] Assignee: Daicel Chemical Industries, Ltd., Osaka, Japan

[21] Appl. No.: 924,662

[22] Filed: Oct. 30, 1986

[30] Foreign Application Priority Data

Nov. 1, 1985 [JP] Japan .................. 60-245678

[51] Int. Cl.$^4$ .......................................... B29C 45/34
[52] U.S. Cl. .................. 425/542; 249/160; 425/808; 425/812
[58] Field of Search ............ 249/122, 173, 117, 160; 425/810, 542, 812, 577, 808

[56] References Cited

U.S. PATENT DOCUMENTS

| | | | |
|---|---|---|---|
| 1,029,488 | 6/1912 | Burghoff et al. | 425/810 |
| 2,998,622 | 9/1961 | Renoux | 425/810 |
| 3,991,971 | 11/1976 | Drake | 425/810 |
| 4,085,178 | 4/1978 | McNeely et al. | 425/810 |
| 4,118,168 | 10/1978 | Rees et al. | 425/810 |
| 4,395,211 | 7/1983 | Broeksema et al. | 425/810 |
| 4,452,748 | 6/1984 | Lange et al. | 425/810 |

Primary Examiner—Willard E. Hoag
Attorney, Agent, or Firm—Armstrong, Nikaido, Marmelstein & Kubovcik

[57] ABSTRACT

An injection mold for injection molding a plastic substrate for high-density information recording medium. An annular sliding member is axially slidably supported in the circumference of a disk-shaped cavity of a mold half. The annular sliding member is biased toward the surface of a disk-shaped cavity provided in another mold half so as to form the molding cavity and maintain contact with said surface during molding of said plastic substrate.

3 Claims, 2 Drawing Sheets

INJECTION MOLD FOR AN OPTICAL DISK

BACKGROUND OF THE INVENTION

1. Field of the Invention

The present invention relates to an injection mold for injection molding substrates for high-density recording media including ROM disks, such as CD's and VD's, and E-DRAW disks.

2. Background Art

Although glass, metals and ceramic materials are used for forming substrates for optical disks, plastic materials are preferable in respect of weight, strength and productivity. However, since the plastic substrate for an optical disk is very thin and flat, having a thickness in the range of 1.2 to 1.5 mm and a diameter of approximately 300 mm at the maximum, and when a plastic material, such as an acrylic resin or a polycarbonate resin, having low fluidity is used, it has been difficult to form a satisfactory plastic substrate by injection molding.

Among the requisite properties of the substrate for optical disks, the capability of reproducing the surface shape of a stamper placed within the mold is the most important property. Generally, the condition, or quality, of reproduction of the surface shape of the stamper on the substrate is dependent on the injection pressure. That is, the higher the injection pressure, the better the transfer of the submicroscopic surface pattern of the stamper for a high-density information recording medium to the substrate. Actually, to improve the transfer of the minute surface shapes in the peripheral portion of the stamper in a thin and flat cavity, high injection pressure is necessary. However, since the disk has a small weight, generally, a disk molding machine capable of applying only a small clamping pressure is employed for molding the disk in spite of the cavity having a large area extending perpendicularly to the direction of the clamping pressure. Accordingly, when a high injection pressure is applied to the injection mold to achieve the satisfactory transfer of the minute surface shapes of the stamper to the disk, the sections of the injection mold are separated from each other along the parting line, and thereby burrs or flashes are formed in the molding.

Generally, the conventional injection mold for injection-molding a plastic substrate for an optical disk has a construction as illustrated in FIGS. 1 or 2.

Referring to FIG. 1, a mold has a molding cavity 3 defined by the inner surfaces of a pair of half molds, for example, a movable half mold 1 and a fixed half mold 2. A stamper 4 having submicroscopic information pits or information tracks is secured to part of the surface of the molding cavity, i.e., the movable mold 1, with a stamper holding ring 5. A ring 6 (for holding another stamper, not shown) is attached opposite the stamper holding ring 5 to the surface of the molding cavity of the fixed half mold. When a molten resin is injected through a sprue 7 into the molding cavity 3, the air in the molding cavity is discharged outside through the gap between the respective surfaces of the rings 5 and 6, and the gap along the parting line 8.

Since the mold having a construction as shown in FIG. 1 opens, i.e., the sections of the mold separate, when a high injection pressure is applied thereto, the molten resin flows into the gap between the rings 5 and 6 to form burrs or flashes. The burrs and flashes require disadvantageously additional burring work and makes the molding cavity dirty, which is a significant problem in manufacturing optical disks which require the utmost cleanliness of the molding cavity.

Another conventional injection mold is shown in FIG. 2, in which members corresponding to those shown in FIG. 1 are designated by the same reference numerals with a prime. The injection mold of FIG. 2 is not provided with the ring 6. In the injection mold of FIG. 2, the circumference 9 of a projection formed in the fixed half mold 2' abuts with the tapered inner circumference of a stamper holding ring 5' to define the molding cavity. This construction does not have the problem of burrs as does the construction shown in FIG. 1. However, since the tapered inner circumference 10 of the stamper holding ring 5' and the circumference 9 of the projection of the fixed half mold 2' must be finished with a very high machining accuracy for a precision fit, it is difficult to fabricate the injection mold and there is a high possibility of seizure occurring between the circumference 9 and the tapered inner circumference 10. Furthermore, since a vent for discharging gas needs to be formed between the circumference 9 and the tapered inner circumference 10, a clearance which will not allow burrs to be formed must be formed between the circumference 9 and the tapered inner circumference 10. Accordingly, in designing the injection mold, two conditions contradictory to each other, namely, forming a clearance as a vent and the preventing of burrs, must be satisfied. This greatly restricts the freedom of design of the mold. Still further, in adjusting the height of the stamper holding ring to regulate the clearance for forming an appropriate vent, the stamper is frequently compressed an excessive amount, and thereby the expansion and contraction of the stamper are restricted. Consequently, the life of the stamper is greatly reduced.

Accordingly, it is an object of the present invention to provide a novel mold which does not have the disadvantages of the known molds, is capable of preventing burrs or flashes, has an enhanced degree of freedom of design, does not have a possibility of seizure, and allows the free expansion and contraction of the stamper.

SUMMARY OF THE INVENTION

According to the present invention, there is provided an injection mold for injection molding a plastic substrate for a high-density information recording medium, the mold comprising a pair of half molds having a disk-shaped cavity, and being characterized in that an annular sliding member is axially slidably supported in the vicinity of the outer circumference of the disk-shaped cavity of one of the half molds, and is biased toward the surface of the disk-shaped cavity of the other half mold by biasing means provided in the former half mold.

DESCRIPTION OF PREFERRED EMBODIMENTS

An injection mold assembly for injection molding a plastic substrate for a high-density recording medium and comprising a pair of half molds having a disk-shaped cavity is itself well known. Refer, for example, to Japanese Patent Publication No. 60-18527 incorporated herein by reference.

Preferably, the annular sliding member featuring the present invention is disposed in the vicinity of the outer circumference of one of the molding cavities so as to constitute a part of the mold assembly which defines the outer circumference of the molding cavity. The sliding member may be held axially slidable in an annular groove formed in a portion of one of the two half molds. The axial sliding travel of the sliding member may correspond to the length of the gap that is formed between the half molds, i.e., the distance the molds separate, when an injection pressure is applied to the injection mold, namely, a value in the range of 0.05 to 0.2 mm.

The biasing means for axially biasing the sliding member may be any well-known biasing means, for example, elastic members such as coil springs, leaf springs or rubber blocks, or a hydraulic circuit. The biasing means apply a force to the sliding member to axially bias the sliding member toward the bottom surface of the molding cavity of the other half mold. Although dependent on the mold clamping force, the biasing force must be smaller than the mold clamping force and, at the same time, must be greater than the sum of the force produced by the resin injected into the molding cavity, the frictional resistance of the resin that works on the sliding member, and the frictional resistances of other parts contiguous to the sliding member that work on the sliding member.

Although the bottom surface of the molding cavity may be the inner surface of the injection mold, generally, a stamper, or die, is placed on the bottom surface of the molding cavity and is held in place by a well-known stamper holder. When a stamper is placed in the molding cavity, the outer end surface of the sliding member must be brought into abutment with the surface of the stamper when the injection mold is closed.

A preferred embodiment of the present invention will be described hereinafter with reference to FIGS. 3 and 4.

Figure 1:
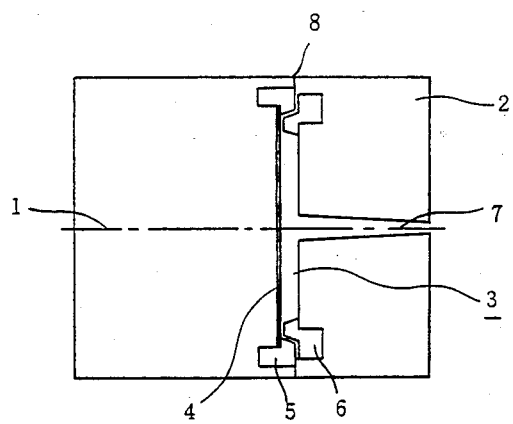
FIGS. 1 and 2 are schematic illustrations of conventional injection molds.
Figure 2:
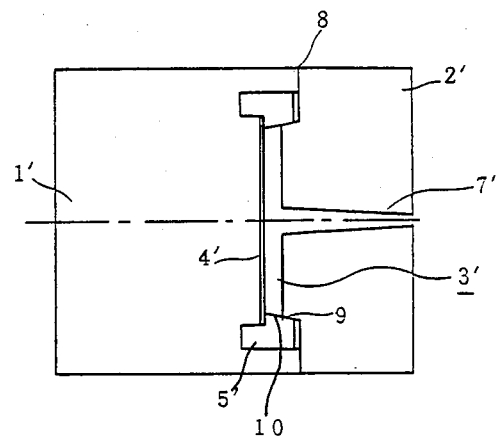
Figure 3:
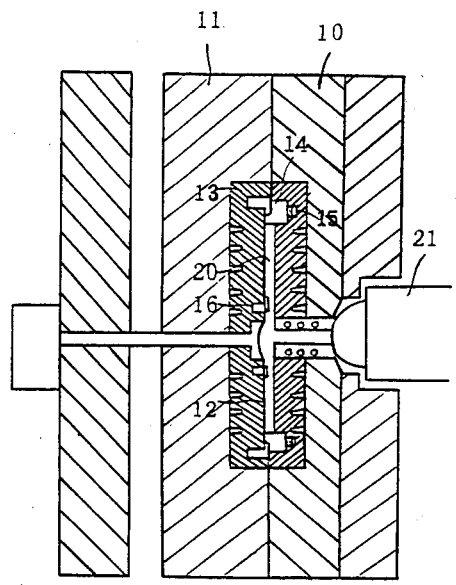
FIG. 3 is a schematic sectional view of an injection mold according to the present invention.

FIG. 3 is a schematic sectional view of an injection mold embodying the present invention, for injection-molding a plastic substrate for an optical disk. A molten resin is injected from an injection nozzle 21 through a sprue into a molding cavity 20 formed between a pair of half molds 10 and 11 to fill the molding cavity 20. A stamper 12 is positioned on one of the bottom surfaces of the molding cavity 20 in the half mold 11. The stamper 12 is held firmly in place with an inner stamper holding ring 16 and an outer stamper holding ring 13.

An annular sliding member 14 is supported in the vicinity of the outer circumference of the half mold 10 which is not provided with a stamper. The annular sliding member 14 is biased axially toward the inner surface of the half mold 11 by coil springs 15.

Figure 4:
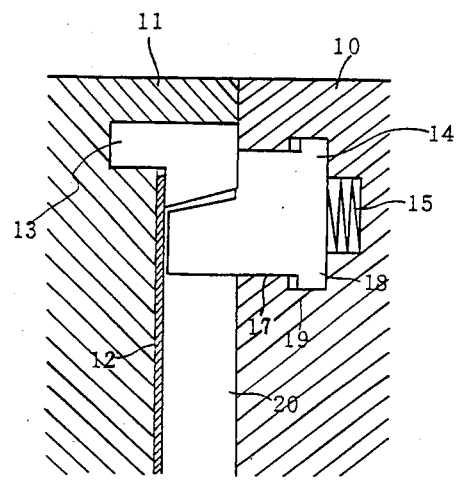
FIG. 4 is an enlarged fragmentary sectional view of the injection mold of FIG. 3.

Referring to FIG. 4 showing the annular sliding member 14 in detail, the annular sliding member 14 is fitted in an annular groove 17 formed in the half mold 10. Flanges 18 formed at the rear end of the sliding member 14 are received in an annular groove 19 having an outer diameter greater than that of the annular groove 17 and an inner diameter smaller than that of the annular groove 17 so that the sliding member 14 will not fall out of the half mold 10 when the injection mold is opened.

In operation, when the plastic resin is injected into the molding cavity 20, the half molds 10 and 11 are caused to separate slightly from each other to form a gap in the range of 0.05 to 0.2 mm, while the sliding member 14 is caused to move axially relative to the half mold 10 in a direction opposite the direction of movement of the half mold 10 by the coil springs 15. As a result of such movement, the sliding member 14 is always in contact with the stamper holding ring 13 during the molding. Consequently, the amount of clearance between the outer circumference of the sliding member 14 and the inner circumference of the stamper holding ring 13 is invariable. Accordingly, it is possible to optionally design the clearance between the outer circumference of the sliding member 14 and the inner circumference of the stamper holding ring 13 to provide a gas vent. Furthermore, since an optional design of the clearance is possible, it is not necessary to adjust the clearance to provide a gas vent by adjusting the stamper holding ring fastening force. Accordingly, an optimum weak fastening force is applied to the stamper, and thereby the life of the stamper is greatly enhanced.

Also, since the sliding member 14 restricts the flow of the resin, burrs or flashes will not be formed on the optical disk. Additionally, the outer circumference of the sliding member 14 and the inner circumference of the stamper holding ring 13 may be finished with a low machining accuracy, so that seizure between the sliding member 14 and the stamper holding ring 13 will not occur.

Although the embodiment described in conjunction with FIGS. 3 and 4 employs a plurality of the coil springs 15, for example, eight coil springs 15, arranged at regular angular intervals along the circumference of the sliding member 14, it is more desirable to employ a hydraulic mechanism to apply a pressure more uniformly to the sliding member 14.

What is claimed is:

1. An injection mold for injection molding a plastic substrate for a high-density information recording medium, comprising:
    (a) first and second half molds each having a disk-shaped cavity, said cavity of said first half mold facing said cavity of said second half mold, said half molds being movable relative to each other so as to form a disk-shaped molding cavity therebetween;
    (b) a means for injecting molten plastic into said disk-shaped molding cavity;
    (c) an annular sliding member axially slidably supported around the outer circumference of said disk-shaped cavity of said first half mold;
    (d) biasing means in said first half mold for biasing said annular sliding member toward the disk-shaped cavity surface of said second half mold; and
    (e) an annular outer ring and a stamper attached to said second half mold, said annular outer ring and said stamper maintaining a constant clearance with a portion of said annular sliding member to provide a gas vent when said molding cavity is formed.

2. The injection mold of claim 1 wherein said biasing means comprises springs.

3. The injection mold of claim 1 wherein said biasing means comprises a hydraulic mechanism.

* * * * *